United States Patent

Cottatellucci

[15] 3,657,562

[45] Apr. 18, 1972

[54] ELECTRONIC SWITCHING ARRANGEMENT

[72] Inventor: Ezio Cottatellucci, Milan, Italy

[73] Assignee: Societa Italiana Telecommunicazioni Siemens S.p.A., Milan, Italy

[22] Filed: June 25, 1970

[21] Appl. No.: 49,731

[30] Foreign Application Priority Data

June 26, 1969 Italy ....................18711 A/69

[52] U.S. Cl. ....................307/243, 307/254, 307/244

[51] Int. Cl. ....................H03k 17/56

[58] Field of Search ....................330/30 D; 307/244, 254, 243

[56] References Cited

UNITED STATES PATENTS

| | | | |
|---|---|---|---|
| 3,241,078 | 3/1966 | Jones | 330/30 D |
| 3,445,780 | 5/1969 | Beelitz | 330/69 |
| 3,260,952 | 7/1966 | Kaye et al. | 330/30 D |
| 3,473,139 | 10/1969 | Legler | 330/30 D |
| 3,435,359 | 5/1969 | Sennhen | 330/30 D |

*Primary Examiner*—Donald D. Forrer
*Assistant Examiner*—Harold A. Dixon
*Attorney*—Karl F. Ross

[57] ABSTRACT

Two or more identical coupling networks, connected between respective signal sources and a common output circuit, are rendered alternately conductive by a control pulse (P) changing the relative magnitude of two biasing voltages applied to the bases of a pair of switching transistors (T2, T3) within each network. The two switching transistors, of like conductivity type (NPN), have their emitters tied to the collector of an input transistor (T1) whose emitter is grounded and whose base receives the message signal to be transmitted; the collectors of the two switching transistors are connected to potential (+) through an output transistor (R) and a dummy load (17), respectively.

12 Claims, 4 Drawing Figures

Ezio Cottatellucci
INVENTOR.

BY

Karl G. Ross
Attorney

Ezio Cottatellucci
INVENTOR.

BY

Karl G. Ross
Attorney

ELECTRONIC SWITCHING ARRANGEMENT

My present invention relates to a circuit arrangement for alternately blocking and unblocking the transmission of message signals to an output impedance, i.e. a load designed to utilize, indicate or retransmit such signals.

In the art of telecommunication, for example, voice-frequency or other message signals from a plurality of subscribers are conventionally transmitted over a common channel, such as a trunk line, by being sampled in cyclic succession and fed to that channel in interleaved relationship. Another instance in which a common load is to be selectively energized from any one of several sources, to the exclusion of all unselected sources, occurs where a coupling network normally linking a signal source with a transmission channel is to be instantly replaced by a standby network in the event of a malfunction.

In any such system the use of mechanical switches or commutators is practical only for relatively slow switching operations and is virtually excluded for high-speed switching occurring, for instance, at frequencies on the order of one megacycle as is customary in time-sharing telecommunication systems. Conventional electronic switches, on the other hand, are not always effective in cutting off the undesired source or sources, i.e. in introducing a sufficiently high attenuation (virtually infinite in the case of mechanical switches) to prevent objectionable interference or cross-talk.

The general object of my present invention is to provide an improved electronic switching system for the virtually complete interruption, in response to one type of command signal, of a signal path from a source to a load with minimum dissipation of electrical energy and without appreciable distortion of any message signals thereupon transmitted to the load via an alternate link, and for practically instantaneous restoration of message-signal transmission over that path in response to another type of command signal.

A more specific object is to provide a switching system of this type particularly designed to handle a band of relatively low frequencies, e.g. in the audio range, with the aid of substantially noninductive impedance elements adapted to be realized by conventional integrated-cricuit technique.

In accordance with the present invention I provide a coupling network having a first terminal for the arriving message signals, a second terminal connected to the output impedance or load designed to receive these signals, and a third terminal connected to a source of command signals such as a generator of rectangular voltage pulses. Two switching transistors of the same conductivity type, e.g. NPN, have respective output electrodes (collectors) connected to one pole of a source of operating current through the output impedance or main load and through a similar impedance constituting a dummy load, respectively; the common input/output electrodes (emitters) of the two switching transistors are connected to the other pole of the current source in a return path which extends from a junction of these electrodes through an input impedance, advantageously another transistor, whose magnitude is controlled by the message signals applied to the first terminal of the network. The control electrodes (bases) of the two switching transistors are connected in a biasing circuit which includes means responsive to the command signal on the third terminal for varying the relative magnitude of the potentials of these control electrodes, thereby alternately blocking and unblocking one switching transistor with concurrent unblocking and blocking, respectively, of the other switching transistor.

More specifically, the signal-responsive biasing means for the two control electrodes may include an ancillary transistor advantageously connected across a Zener diode which establishes a normal bias for the base of one switching transistor when the ancillary transistor is cut off by the command signal; the base of the other transistor may have a fixed reference potential applied thereto with the aid of a similar Zener diode. Generally, a positive or negative difference of only a few volts between the two base potentials will suffice to render one switching transistor conductive to the exclusion of the other, thereby energizing either the main load or the dummy load.

Various means may be used for increasing the apparent impedance of the transmission circuit leading to the main load. Thus, a condenser shunted across the Zener diode in the base lead of the switching transistor in that circuit will effectively ground the transistor for high-frequency signals and transients which could otherwise capacitively pass the transistor even in its nonconductive state. Alternatively, or in addition, a unidirectionally conductive impedance such as a diode or a further transistor may be connected in tandem with this switching transistor, generally between the emitter thereof and the junction of the emitter leads from the two switching transistors.

While a single coupling network of this description may be used in a system with only one source of message signals to be intermittently transmitted to the load, the preferred field of use for my present improvement is in a system of the multiplex type in which two or more such networks are individually inserted between respective signal sources and a common load.

The invention will be described hereinafter with reference to the accompanying drawing in which.

Figure 1:
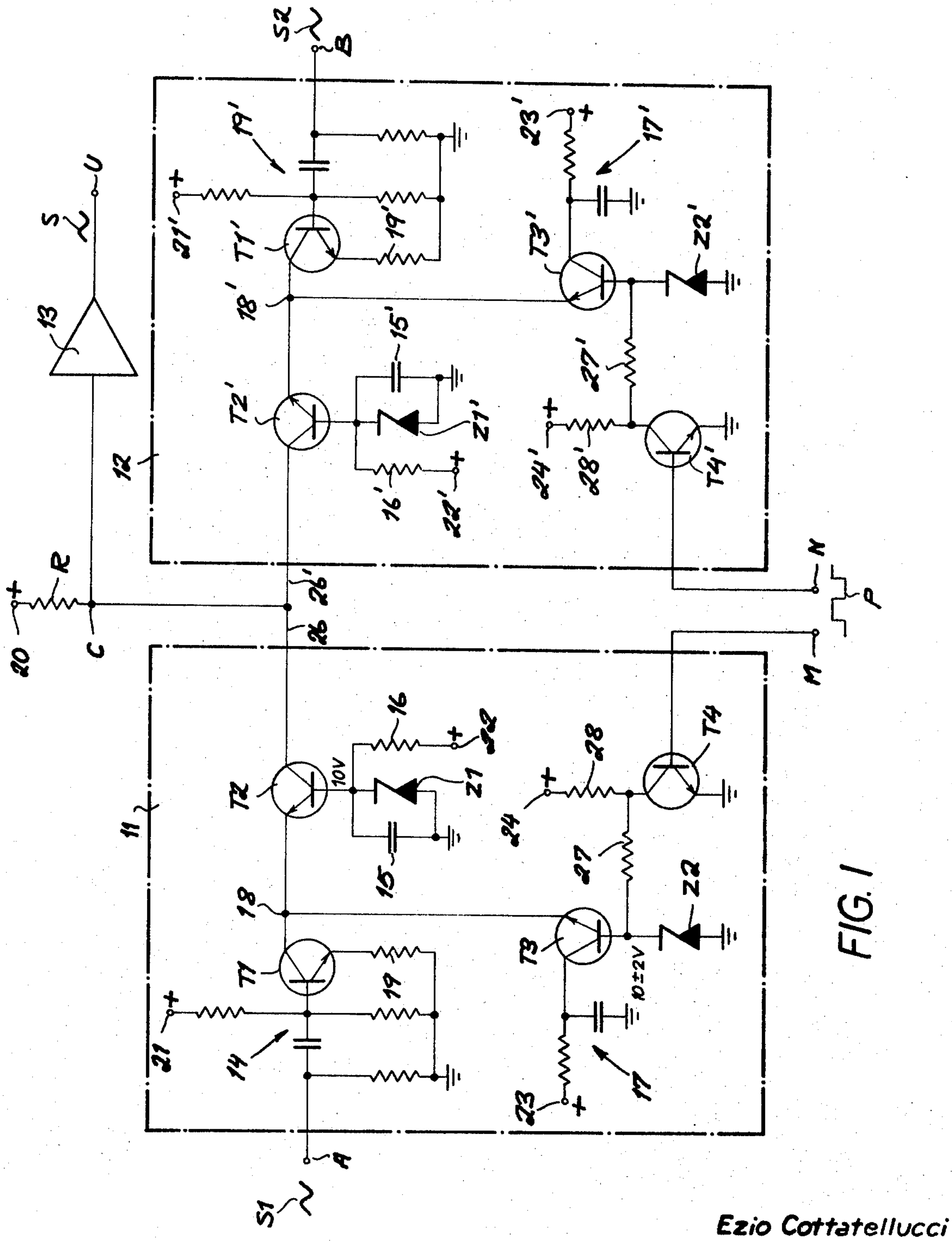
FIG. 1 is a circuit diagram showing a representative embodiment with two alternately switchable coupling networks according to the invention.

The system shown in FIG. 1 comprises two symmetrical coupling networks 11, 12 of identical construction inserted between individual input terminals A, B and a common terminal 20 representing the positive pole of a source of direct current whose negative pole is grounded. Message signals S1 and S2, respectively appearing on terminals A and B, are alternately transmitted via networks 11 and 12 to a point C which is connected to terminal 20 through a load resistor R. The voltage drop developed across this load resistor is transmitted by way of an amplifier 13 to a terminal U as an output signal S.

In view of the similarity of the two coupling networks, only network 11 will be described in detail; corresponding elements of network 12 have been designated by the same reference characters with the addition of a prime mark.

Network 11 includes four transistors T1, T2, T3 and T4, all of the NPN type. Transistor T1 has its base connected to input terminal A through a mainly resistive pad 14 which has a supply terminal 21 energized with positive voltage from the direct-current source. The emitter of transistor T1 is connected to ground through a stabilizing feedback resistor 19, its collector being tied to a junction 18 together with the emitters of transistors T2 and T3. The base of transistor T2 is grounded through a Zener diode Z1, shunted by a condenser 15, and is connected to positive potential at a point 22 through a resistor 16 which, together with Zener Z1, constitutes a voltage divider maintaining the base potential at a predetermined positive level, e.g. of 10V. A similar Zener diode Z2, together with two series resistors 27 and 28 connected to positive potential at a point 24, serves as a voltage divider to maintain the base of transistor T3 at a slightly higher potential, e.g. of 12V, in the nonconductive state of transistor T4 whose collector is tied to the junction of resistors 27 and 28; the emitter of transistor T4 is grounded. Operating current is supplied to the collector of transistor T3 from a point 23 of positive potential through the resistive branch of a dummy load 17 shown as an RC circuit. The collector of transistor T2 has a lead 26 extending to point C.

The bases of ancillary transistors T4 and T4′ in networks 11 and 12 are tied to respective terminals M and N across which a command signal P, here shown as a square wave, is applied. The amplitude of this command signal is sufficient, during positive half-cycles, to drive the corresponding transistor T4 or T4' to a state of high conductivity. When transistor T4 is thus turned on, the potential at the junction of resistors 27 and 28 is sharply lowered so that the base voltage of transistor T3 is instantly reduced to, say, 8V.

In this manner, the base potential of switching transistor T3 alternately drops below and rises above that of switching transistor T2. In the first case, junction 18 is positive with reference to the base of transistor T3 but negative with reference to the base of transistor T2 so that the latter conducts and the former is cut off; the signal S1 is thereby transmitted through coupling network 11 to point C and thence to output terminal U. In the second case, the roles of the two switching transistors are reversed; signal S1 now passes through the transistor T3 to the dummy load 17 without reaching the output lead 26. Naturally, the conductive condition of transistor T2 coincides with the nonconductive state of transistor T2', and vice versa, whereby point C is continually energized by either the signal S1 or the signal S2.

Figure 2:
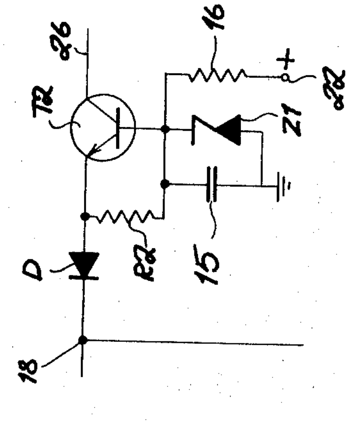
FIGS. 2 and 3 are partial diagrams of one of these networks, illustrating two modifications.

Input transistor T1, by virtue of its feedback resistor 19, has a relatively high internal resistance so as to be substantially insensitive to switching transients generated at transistors T2 and T3. As illustrated in FIG. 2, a diode D may be inserted between junction 18 and the emitter of transistor T2 to increase its effective resistance during cutoff. A resistor R2 is shown connected in this embodiment across the emitter and base of the transistor to insure a sharp cutoff and to provide a leakage path for peaks of reverse voltage which could otherwise overbias the diode D.

Figure 3:
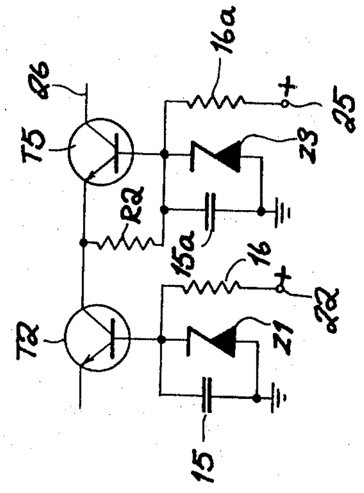

As shown in FIG. 3, diode D may be replaced by a further transistor T5 connected in tandem with transistor T2 between the collector of the latter and lead 26, transistor T5 being a substantial duplicate of the former and being provided with a similar biasing circuit including a resistor **16*a* leading to a positive terminal 25 and a Zener diode Z3 shunted by a condenser 15*a*. A resistor R2 is again bridged across the emitter and the base of the output-side transistor (here T5) in the manner and for the purpose described with reference to FIG. 2**. Transistor T5 may be regarded in this case as the principal switching transistor, with transistor T2 playing mainly a protective role.

Figure 4:
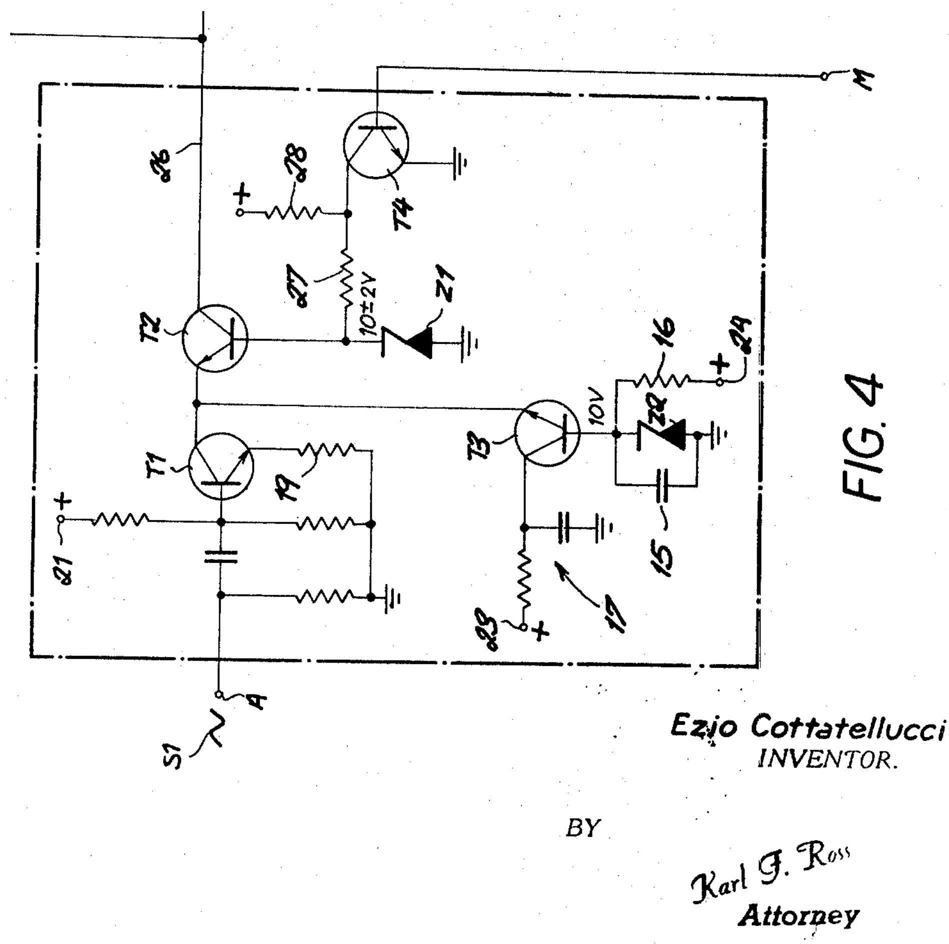
FIG. 4 is a complete circuit diagram of the same network modified in accordance with a further embodiment.

In FIG. 4, finally, I have shown a relocation of ancillary transistor T4 whose collector resistor 27 is now connected to the base of transistor T2, the body of transistor T4 being thus connected in parallel with Zener Z1. Capacitor 15 and resistor 16 have correspondingly been relegated to the base circuit of transistor T3. The operation of this system is identical with that of FIG. 1, except that signals S1 will be transmitted to lead 26 when terminal M goes negative rather than positive, i.e. when transistor T4 is cut off instead of conducting.

Naturally, the circuit 17 or 17' referred to as a dummy load could also serve as an alternate receiver (e.g. a recorder) for signals prevented from reaching the main load R, 13.

I claim:

1. A circuit arrangement for alternately blocking and unblocking the transmission of message signals to an output impedance, comprising:

a coupling network with a first terminal connected to receive said message signals, a second terminal connected to said output impedance and a third terminal connected to a source of command signals;

a first switching transistor and a second switching transistor each having an output electrode, a common electrode and a control electrode, said switching transistor being of the same conductivity type;

a source of operating current for said switching transistors connected to the output electrode of said first switching transistor through said output impedance by way of said second terminal and to the output electrode of said second switching transistor through a dummy load;

an electronically variable input impedance connected in a return path leading from the common electrodes of both switching transistors to said source of operating current, said input impedance having control means connected to said first terminal;

biasing means for at least one of said switching transistors connected between the control electrode thereof and said third terminal for varying the relative magnitude of the potentials of said control electrodes in response to said command signals, thereby alternately blocking and unblocking said first switching transistor with concurrent unblocking and blocking, respectively, of said second switching transistor;

a unidirectionally conductive impedance inserted between said input impedance and the common electrode of said first switching transistor; and a shunt resistance bridging the common and control electrodes of said first switching transistor ahead of said unidirectionally conductive impedance.

2. A circuit arrangement as defined in claim 1 wherein said unidirectionally conductive impedance comprises a further transistor connected in tandem with said first switching transistor.

3. A circuit arrangement as defined in claim 3, further comprising capacitive means shunting said Zener diode.

4. A circuit arrangement as defined in claim 1 wherein the other of said switching transistors has its control electrode connected to a source of fixed biasing potential.

5. A circuit arrangement as defined in claim 4 wherein said source of fixed biasing potential includes a Zener diode.

6. A circuit arrangement as defined in claim 5 wherein said biasing means includes a second Zener diode connected to the control electrode of said one of said switching transistors.

7. A circuit arrangement as defined in claim 6 wherein said biasing means further includes an ancillary transistor connected across said second Zener diode.

8. A circuit arrangement for alternately blocking and unblocking the transmission of message signals to an output impedance, comprising:

a coupling network with a first terminal connected to receive said message signals, a second terminal connected to said output impedance and a third terminal connected to a source of command signals;

a first switching transistor and a second switching transistor each having an output electrode, a common electrode and a control electrode, said switching transistors being of the same conductivity type, said control electrode being connected to a source of fixed biasing potential including a respective Zener diode for each of said switching transistors;

a source of operating current for said switching transistors connected to the output electrode of said first switching transistor through said output impedance by way of said second terminal and to the output electrode of said second switching transistor through a dummy load;

an electronically variable input impedance connected in a return path leading from the common electrodes of both switching transistors to said source of operating current, said input impedance having control means connected to said first terminal; and an ancillary transistor with an output circuit connected across one of said Zener electrodes and with an input lead connected to said third terminal for varying the relative magnitude of the potentials of said control electrodes in response to said command signals, thereby alternately blocking and unblocking said first switching transistor with concurrent unblocking and blocking, respectively, of said second switching transistor.

9. A system for alternately connecting an output impedance to several sources of message signals, comprising a plurality of networks as defined in claim 8 with said first terminals thereof respectively connected to said sources of message signals, said second terminals thereof jointly connected to said output impedance, and said third terminals thereof connected to a generator of command signals for selectively unblocking the first switching transistor of only one network at a time.

10. A circuit arrangement as defined in claim 8, further comprising a unidirectionally conductive impedance inserted between said input impedance and the common electrode of said first switching transistor.

11. A circuit arrangement as defined in claim 8 wherein said input impedance is another transistor with a collector connected to said common electrodes.

12. A circuit arrangement as defined in claim 11 wherein said other transistor has a collector connected through a feedback resistor to a point of fixed potential.

* * * * *